United States Patent
Schneider (10) Patent No.: US 8,156,333 B2
(45) Date of Patent: Apr. 10, 2012

(54) USERNAME BASED AUTHENTICATION SECURITY

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 977 days.

(21) Appl. No.: 12/156,278

(22) Filed: May 29, 2008

(65) Prior Publication Data

US 2009/0300364 A1 Dec. 3, 2009

(51) Int. Cl.
*H04L 29/06* (2006.01)
(52) U.S. Cl. .......... 713/168; 713/150; 713/178; 726/2; 726/3; 726/4; 726/5
(58) Field of Classification Search .......... 713/168, 713/178
See application file for complete search history.

(56) References Cited

U.S. PATENT DOCUMENTS

| | | | |
|---|---|---|---|
| 6,049,612 A | 4/2000 | Fielder et al. | |
| 6,073,234 A * | 6/2000 | Kigo et al. | 713/161 |
| 6,085,320 A * | 7/2000 | Kaliski, Jr. | 713/168 |
| 6,243,811 B1 | 6/2001 | Patel | |
| 6,401,206 B1 * | 6/2002 | Khan et al. | 713/176 |
| 6,883,717 B1 | 4/2005 | Kelley et al. | |
| 7,073,061 B2 | 7/2006 | Asano et al. | |
| 7,194,765 B2 * | 3/2007 | Blom | 726/12 |
| 7,231,521 B2 | 6/2007 | Buddhikot et al. | |
| 7,363,651 B2 | 4/2008 | de Jong et al. | |
| 7,673,142 B2 * | 3/2010 | Jeffries et al. | 713/169 |
| 2003/0093671 A1 * | 5/2003 | Owlett | 713/168 |
| 2003/0233546 A1 * | 12/2003 | Blom | 713/168 |
| 2003/0236803 A1 | 12/2003 | Williams | |
| 2005/0081036 A1 | 4/2005 | Hsu | |
| 2007/0226784 A1 * | 9/2007 | Ueda et al. | 726/5 |
| 2008/0155112 A1 | 6/2008 | Ma et al. | |
| 2008/0301435 A1 * | 12/2008 | Simon | 713/155 |
| 2009/0287929 A1 | 11/2009 | Kolesnikov et al. | |

OTHER PUBLICATIONS

Kiryukov, Alex et al., "Cryptanalysis of the Alleged SecurID Hash Function (extended version)" Lecture Notes in Computer Science, Springer-Verlag, 2003, 18 pages.
Office Action for U.S. Appl. No. 12/111,893 mailed Apr. 14, 2011.
Office Action for U.S. Appl. No. 12/201,321 mailed Apr. 27, 2011.

* cited by examiner

*Primary Examiner* — Ponnoreay Pich
(74) *Attorney, Agent, or Firm* — Lowenstein Sandler PC (57) ABSTRACT

An apparatus and a method for an authentication protocol. In one embodiment, a client requests for an authentication challenge from a server. The server generates the authentication challenge and sends it to the client. The authentication challenge includes the authentication context identifier, a random string, a timestamp, and a signature value. The client computes a salt value based on a username and the authentication context identifier from the authentication challenge. The signature value is computed based on the authentication context identifier, the random string, and the timestamp. The client computes a hashed password value based on the computed salt value, and a message authentication code based on the hashed password value and the random string. The client sends a response to the server. The response includes the username, the message authentication code, the random string, the timestamp, and the signature value.

20 Claims, 6 Drawing Sheets

USERNAME BASED AUTHENTICATION SECURITY

TECHNICAL FIELD

Embodiments of the present invention relate to computing systems, and more particularly, to authentication over an insecure channel.

BACKGROUND

One means of authentication includes the use of password on computer systems. For example, on UNIX-type systems, the password for an account is stored in a hashed form. To make it harder for an attacker who has access to the hashed password to perform a class of brute force attacks and potentially gain knowledge of several passwords at once, the password is augmented with a small random value, also known as "salt" before it is hashed. The salt value and the hashed password are then stored in association with other account properties.

Since the salt value is randomly generated, only someone who already has access to the hashed password can compute what a hashed password value should be. This means that the hashed password has to be passed to the authentication process in clear text form. So, either the password must only be used over a secure connection, or the password can be stolen by an eavesdropper.

Thus, a need exists for a technique for a remote connection to authenticate itself over an insecure channel, without providing the password, without the server having access to the password in clear text, or without every password requiring the same type of encryption.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for an authentication protocol. In one embodiment, a client requests an authentication challenge from a server. The server generates the authentication challenge and sends it to the client. The authentication challenge includes an authentication context identifier, a random string, a timestamp, and a signature value. The client computes a salt value based on a username and the authentication context identifier from the authentication challenge. The signature value is computed based on the authentication context identifier, the random string, and the timestamp. The client computes a hashed password value based on the computed salt value, and a message authentication code based on the hashed password value and the random string. The client sends a response to the server. The response includes the username, the message authentication code, the random string, the timestamp, and the signature value.

Figure 1:
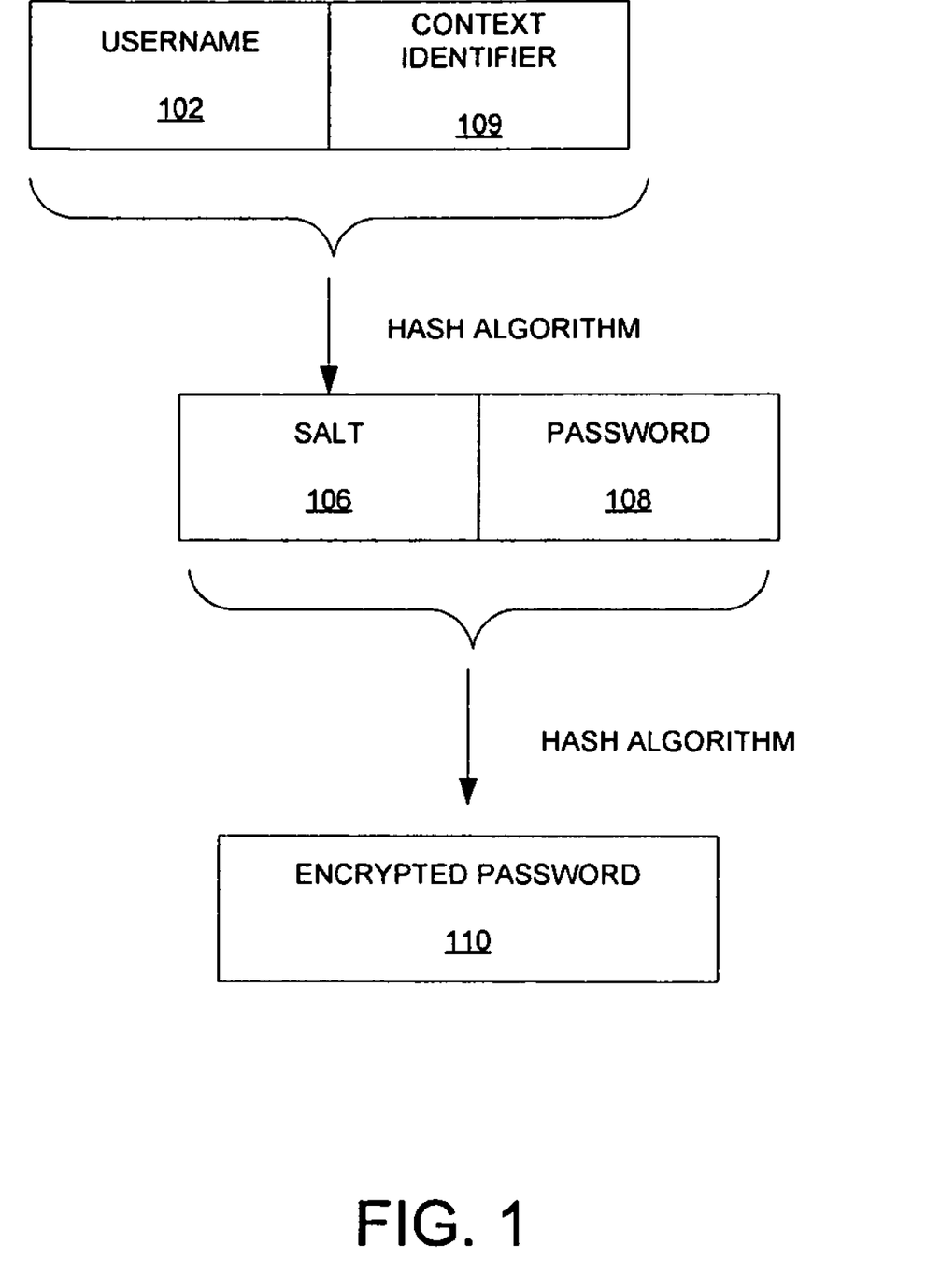
FIG. 1 is a block diagram illustrating one embodiment of a username-based authentication security.

FIG. 1 is a block diagram illustrating one embodiment of a username-based authentication scheme. Instead of using a random value for a salt, a username may be used as a basis for the salt value. In that way, the user is able to calculate the hashed password value himself. So that the same password can be used on multiple different systems, the username can be augmented with a system-specific authentication context identifier (e.g. a random string that each authentication system uses to distinguish itself). A salt value 106 can be calculated by concatenating a context identifier 104 and a username 102, and taking the cryptographic hash of that. Alternately, the context identifier 104 can be used as the key in a Message Authentication Code (MAC) over the username 102. An encrypted password 110 can be hashed by concatenating the calculated salt value 106 and a password 108, then hashing the result, or by using the salt value 106 as the key in a MAC construction (or, alternately, using the password as the key, and the salt as the "message").

Figure 2:
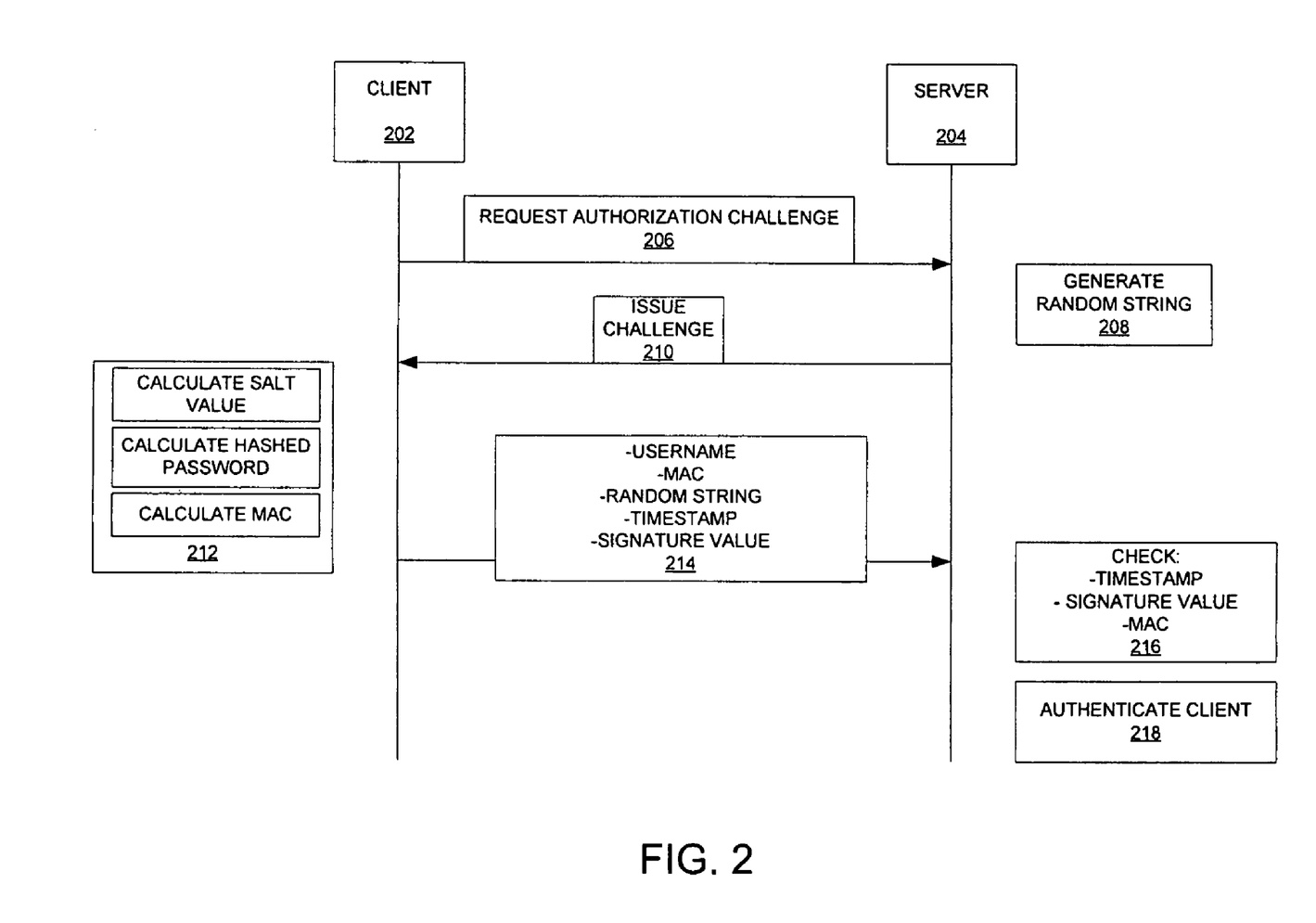
FIG. 2 is a ladder diagram illustrating one embodiment of a process for authentication over an unsecured channel.

FIG. 2 is a ladder diagram illustrating one embodiment of a process for authentication over an unsecured channel between a client 202 and a server 204. In 206, client 202 sends a request for an authentication challenge to server 204.

In 208, server 204 generates a random string. In 210, server 204 issues a challenge consisting of its authentication context identifier, the random string, its current timestamp, and a signature value computed over all three of these items (such as a MAC, using its own secret key).

In 212, client 202 takes the authentication context identifier and the username to calculate the salt value. Client 202 then takes the salt value and the password, and calculates the hashed password value. Client 202 then takes the hashed password value and calculates a MAC over the random string in the challenge, using the hashed password value as the key (or, the challenge string and hashed password could take the opposite roles). In another embodiment, client 202 calculates a MAC over the random challenge, where the random challenge also includes the timestamp. In 214, client 214 returns to server 204 the username, the MAC it just calculated, the random string, the timestamp, and the signature value from the original challenge.

In 216, server 204 ensures that the timestamp isn't too old, and that the signature value matches the random string and timestamp. If these match, it takes its copy of the hashed password matching the given username and calculates a MAC using the random value and hashed password as inputs. If the calculated MAC matches the one given by client 202, client 202 is authenticated in 218.

The timestamp is there to prevent an eavesdropper from performing a replay attack Oust resending a response it has previously recorded). In one embodiment, server 204 keeps track of each random value it receives as part of a successful authentication for the valid duration of a challenge. For example, if server 204 considers a timestamp that's 180 seconds old as no longer valid, it has to keep track of the random values used in successful authentications for 180 seconds.

In another embodiment, server 204 does not track random values associated with unsuccessful authentication attempts to prevent denial of service attacks, where an attacker sends a random response to server 204 every time it intercepts a challenge, effectively locking out legitimate clients.

Alternatively, server 204 can track all random values it issues as challenges forever, and stop allowing authentication attempts with a particular random value after a number of failed authentication attempts, or one successful attempt. In this case, the challenge would not need a timestamp or a signature value; if the random value does not show up in the server's list of issued values, it is not valid.

It should be noted that the hashed password is being used as secret data in this case. So disclosure of the server's password file will allow the attacker to impersonate any user on the server. However, the use of a per-server authentication context identifier will prevent the attack from spreading to other authentication contexts (essentially, systems protected by other authentication servers).

Figure 3:
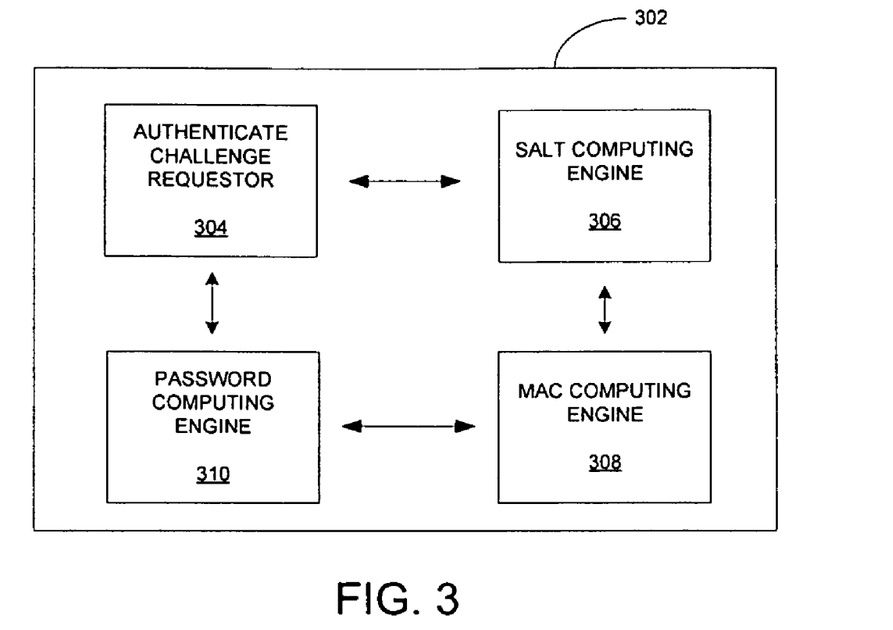
FIG. 3 is a block diagram illustrating one embodiment of a client for authentication over an unsecured channel.

FIG. 3 is a block diagram illustrating one embodiment of a client 302 for authentication over an unsecured channel with a server. Client 302 includes an authentication challenge requestor 304, a salt computation engine 306, a password computation engine 310, and a MAC computation engine 308. The authentication challenge requestor 304 is configured to request an authentication challenge from a server. In one embodiment, the authentication challenge includes an authentication context identifier, a random string, a timestamp, and a signature value. The signature value is computed based on the authentication context identifier, the random string, and the timestamp.

Salt computation engine 306 is configured to compute a salt value based on a username and the authentication context identifier of the authentication challenge. Hashed password computation engine 310 is configured to compute a hashed password value based on the salt value. MAC 308 is configured to compute a message authentication code based on the hashed password value and the random string of the authentication challenge.

In another embodiment, authentication challenge requestor 304 is also configured to send a response to a server. The response can include among others the username, the message authentication code, the random string, the timestamp, and the signature value.

Figure 4:
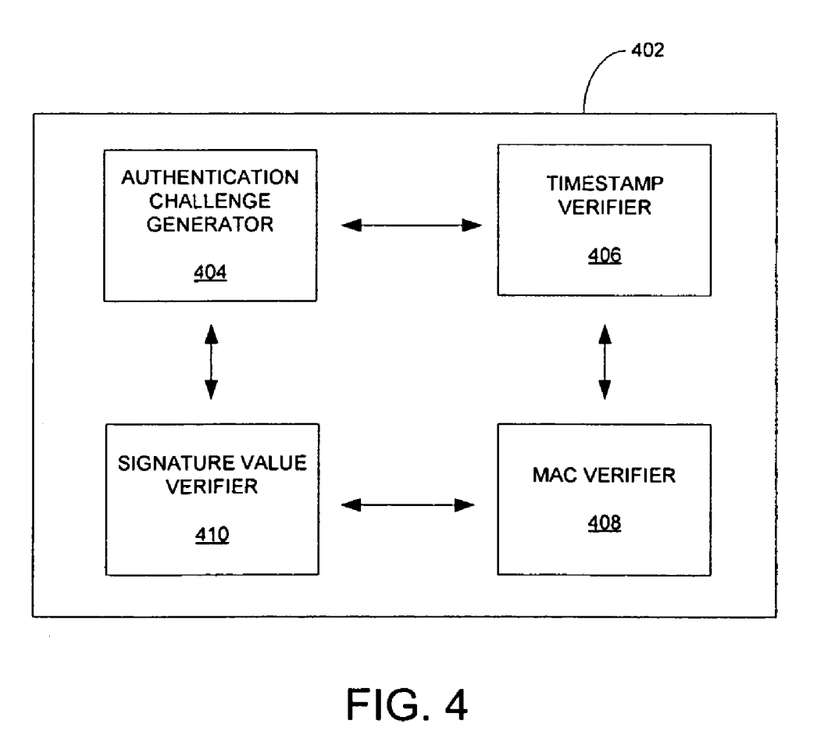
FIG. 4 is a block diagram illustrating one embodiment of a server for authentication over an unsecured channel.

FIG. 4 is a block diagram illustrating one embodiment of a server 402 for authentication over an unsecured channel with a client. Server 402 includes an authentication challenge generator 404, a time stamp verifier 406, a signature value verifier 410, and a MAC verifier 408. Authentication challenge generator 404 is configured to generate a random string and an authentication challenge comprising an authentication context identifier, the random string, a timestamp, a signature value based on the authentication context identifier, the random string, and the timestamp.

Time stamp verifier 406 is configured to verify the validity of the timestamp in a response from the client. The response is based on a salt value. The salt value is based on a username and the authentication context identifier. In one embodiment, the response includes at least the username, the client message authentication code, the random string, the timestamp, and the signature value.

Signature value verifier 410 is configured to verify the validity of the signature value. The signature value is computed based on the authentication context identifier, the random string, and the timestamp.

Message authentication code verifier 408 is configured to verify the validity of a client message authentication code in the response. In one embodiment, message authentication code verifier 408 retrieves a hashed password associated with the username provided in the response, computes a server message authentication code based on the random string and the retrieved hashed password, and compares the server message authentication code with the client message authentication code to authenticate the client.

Figure 5:
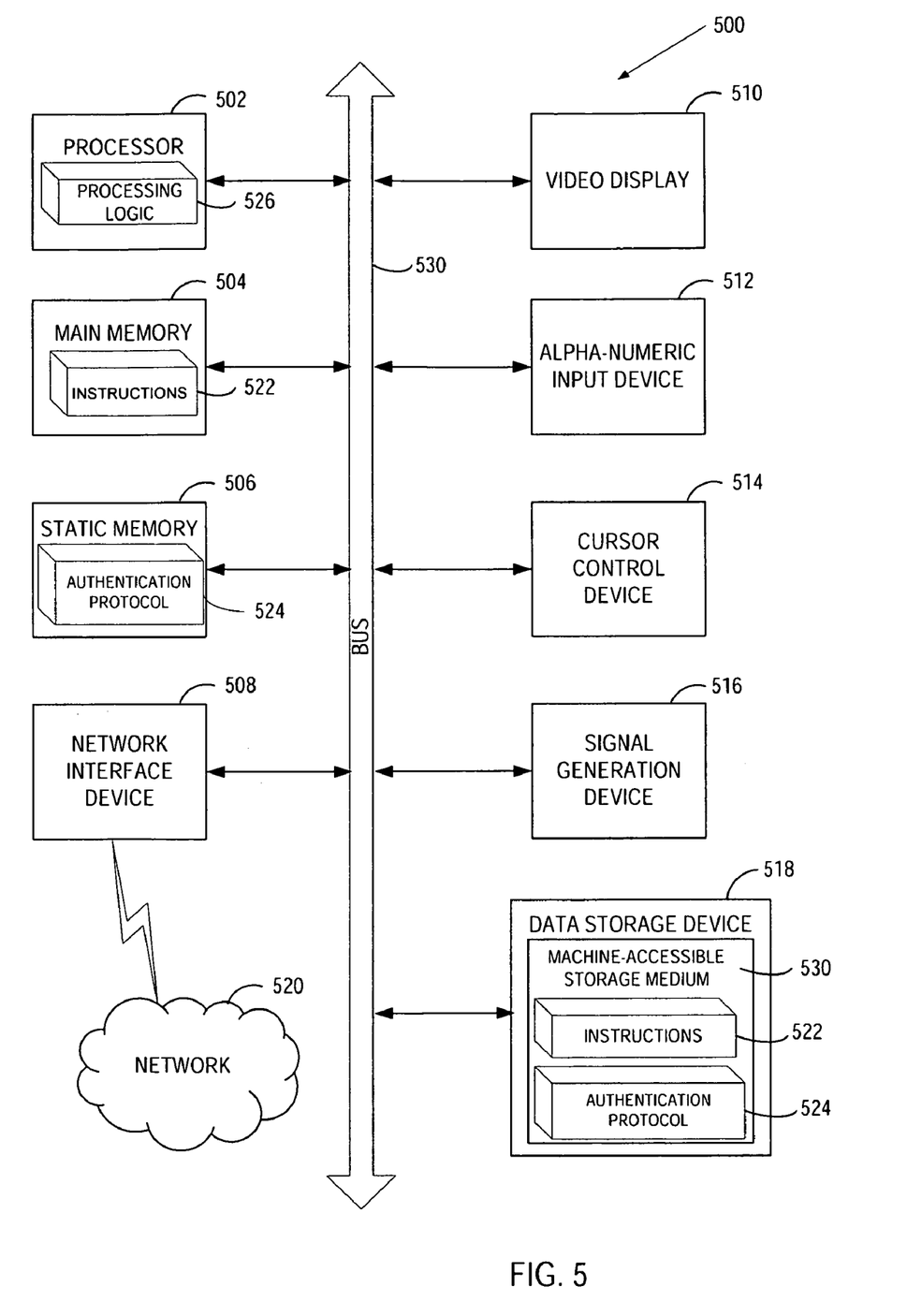
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the authentication protocol 524 as presently described. The authentication protocol 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
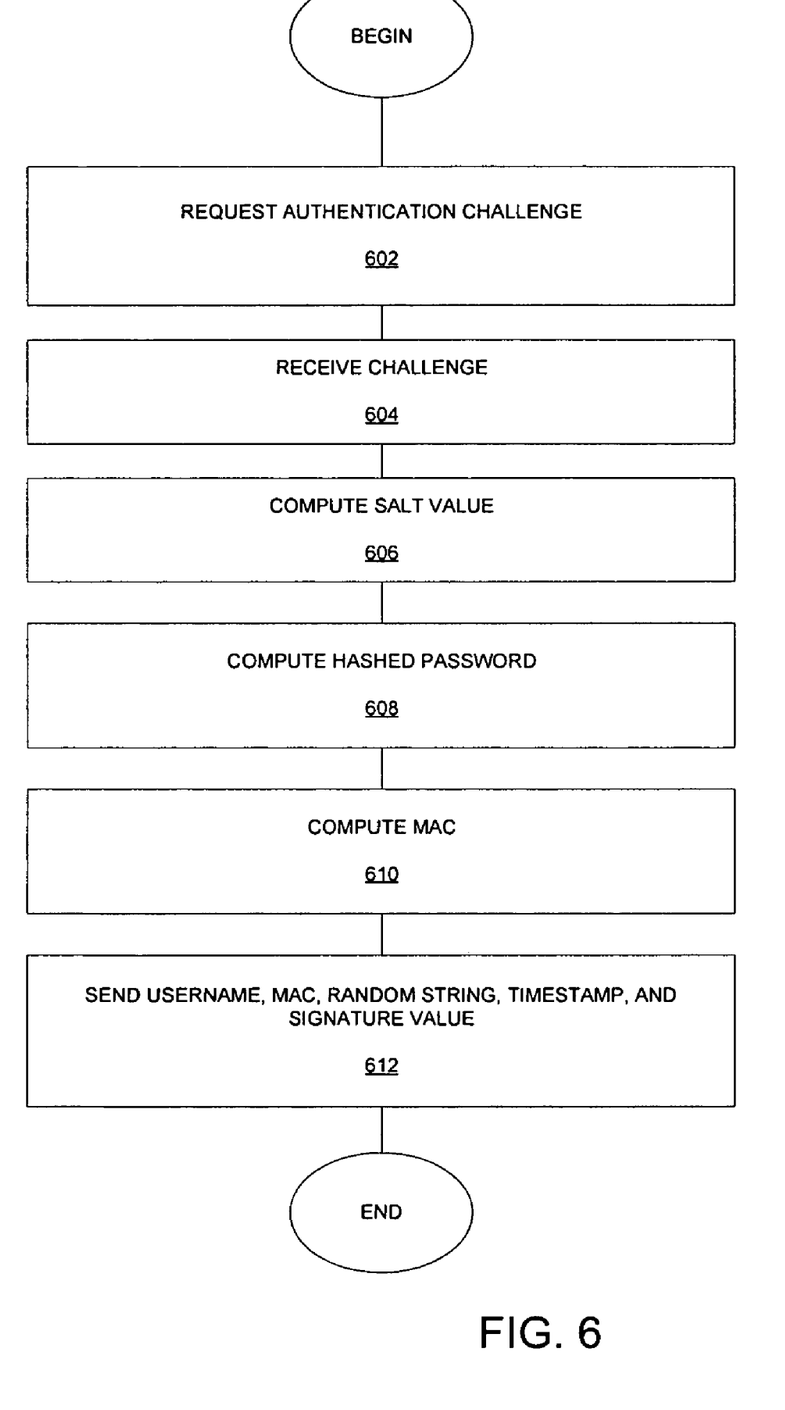
FIG. 6 is a flow diagram illustrating a method for authenticating a communication from a client over an unsecured channel.

FIG. 6 is a flow diagram illustrating a method for authenticating a communication from a client over an unsecured channel. At 602, a client requests for an authentication challenge from a server. At 604, the authentication challenge is received from the server. At 606, a salt value is computed based on a username and an authentication context identifier of the authentication challenge. In one embodiment, the authentication challenge includes the authentication context identifier, a random string, a timestamp, and a signature value. The signature value is computed based on the authentication context identifier, the random string, and the timestamp.

At 608, a hashed password value is computed based on the computed salt value. At 610, a message authentication code is computed based on the hashed password value and the random string. In another embodiment, the client calculates a MAC over the random challenge, where the random challenge also includes the timestamp. At 612, the client returns a response to the server. In one embodiment, the response includes the username, the message authentication code, the random string, the timestamp, and the signature value.

Figure 7:
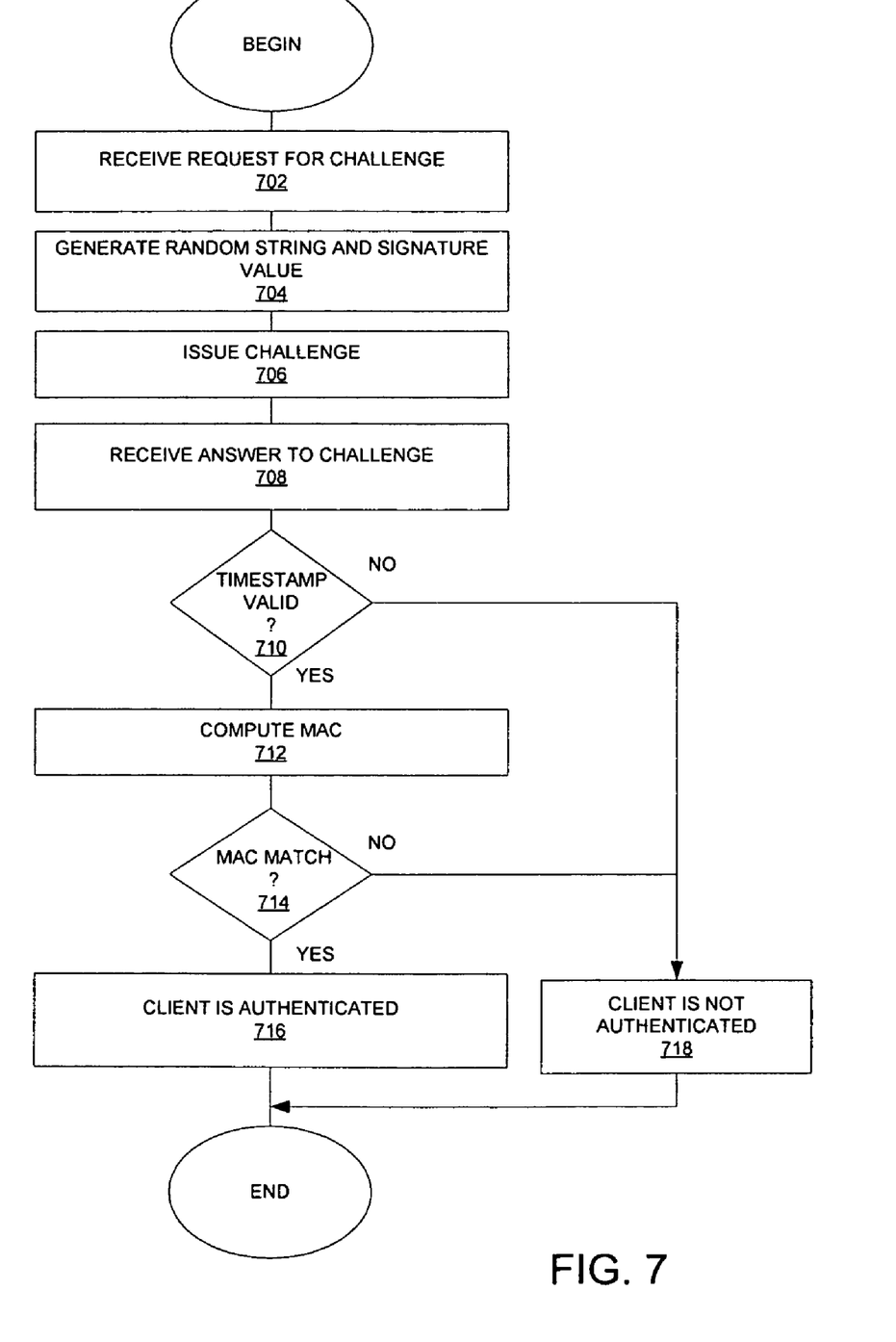
FIG. 7 is a flow diagram illustrating a method for authenticating a communication from a server over an unsecured channel.

FIG. 7 is a flow diagram illustrating a method for authenticating a communication from a server over an unsecured channel. At 702, a server receives a request for an authentication challenge from a client. At 704, the server generates a random string, a authentication context identifier, a timestamp, and a signature value. The authentication challenge includes a username, a client message authentication code, the random string, the timestamp, and the signature value. The signature value is computed based on the authentication context identifier, the random string, and the timestamp.

At 706, the server sends the authentication challenge to the client. At 708, the server receive a response to the authentication challenge from the client. The response based on a salt value, the salt value based on a username and an authentication context identifier.

At 710, the server verifies the validity of the timestamp and the signature value.

At 712, the server retrieves a hashed password associated with the username provided in the response and computes a server message authentication code based on the random string and the retrieved hashed password. At 714 the server compares the server message authentication code with the client message authentication code to authenticate the client at 716. If the timestamp is found to be not valid or if the server MAC and the client MAC do not match, the client is not authenticated.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving, by a processing device at a server, a request for an authentication challenge from a client;
   generating and sending the authentication challenge to the client;
   receiving a response to the authentication challenge from the client; and
   authenticating the client based on the response, the response based on a salt value, the salt value based on a username and an authentication context identifier.

2. The computer-implemented method of claim 1 wherein generating the authentication challenge further comprises:
   generating a random string, the authentication context identifier, a timestamp, and a signature value.

3. The computer-implemented method of claim 2 wherein the signature value is computed based on the authentication context identifier, the random string, and the timestamp.

4. The computer-implemented method of claim 3 wherein the response further comprises the username, a client message authentication code, the random string, the timestamp, and the signature value.

5. The computer-implemented method of claim 4 further comprising:
   verifying the validity of the timestamp and the signature value;
   retrieving a hashed password associated with the username provided in the response;
   computing a server message authentication code based on the random string and the retrieved hashed password; and
   comparing the server message authentication code with the client message authentication code to authenticate the client.

6. A non-transitory computer-accessible storage medium including data that, when accessed by a computer, cause the computer to perform a method comprising:
   receiving, by a processing device at a server, a request for an authentication challenge from a client;
   generating and sending the authentication challenge to the client;
   receiving a response to the authentication challenge from the client; and
   authenticating the client based on the response, the response based on a salt value, the salt value based on a username and an authentication context identifier.

7. The non-transitory computer-accessible storage medium of claim 6 wherein generating the authentication challenge further comprises:
   generating a random string, the authentication context identifier, a timestamp, and a signature value.

8. The non-transitory computer-accessible storage medium of claim 7 wherein the signature value is computed based on the authentication context identifier, the random string, and the timestamp.

9. The non-transitory computer-accessible storage medium of claim 8 wherein the response further comprises the username, a client message authentication code, the random string, the timestamp, and the signature value.

10. The non-transitory computer-accessible storage medium of claim 9 wherein the method further comprises:
    verifying the validity of the timestamp and the signature value;
    retrieving a hashed password associated with the username provided in the response;
    computing a server message authentication code based on the random string and the retrieved hashed password, or the random string, the timestamp, and the retrieved hashed password; and
    comparing the server message authentication code with the client message authentication code to authenticate the client.

11. A server comprising:
    a processing device;
    an authentication challenge generator, executable by the processing device and configured to generate a random string and generate an authentication challenge comprising an authentication context identifier, the random string, a timestamp, a signature value based on the authentication context identifier, the random string, and the timestamp;
    a time stamp verifier coupled to the authentication challenge generator, the time stamp verifier configured to verify the validity of the timestamp in a response, the response based on a salt value, the salt value based on a username and the authentication context identifier;
    a signature value verifier coupled to the time stamp verifier, the signature value verifier configured to verify the validity of a signature value in the response; and
    a message authentication code verifier coupled to the time stamp verifier, the message authentication code verifier configured to verify the validity of a client message authentication code in the response.

12. The server of claim 11 wherein the signature value is computed based on the authentication context identifier, the random string, and the timestamp.

13. The server of claim 12 wherein the response further comprises the username, the client message authentication code, the random string, the timestamp, and the signature value.

14. The server of claim 13 wherein the message authentication code verifier is configured to retrieve a hashed password associated with the username provided in the response, to compute a server message authentication code based on the random string and the retrieved hashed password, and to compare the server message authentication code with the client message authentication code to authenticate the client.

15. The server of claim 13 wherein the server is configured to communicate with a client comprising:
    an authentication challenge requestor configured to request an authentication challenge;
    a salt computation engine coupled to the authentication challenge requestor, the salt computation engine configured to compute the salt value based on the username and the authentication context identifier of the authentication challenge;
    a hashed password computation engine coupled to the salt computation engine, the hashed password computation engine configured to compute a hashed password value based on the salt value; and
    a message authentication code computation engine coupled to the salt computation engine, the message authentication code computation engine configured to compute the message authentication code based on a random string of the authentication challenge and the hashed password value, or the random string, the timestamp, and the hashed password value.

16. A computer-implemented method comprising:
- requesting, by a processing device of a client, an authentication challenge from a server;
- receiving the authentication challenge from the server, and
- computing a salt value based on a username and an authentication context identifier of the authentication challenge.

17. The computer-implemented method of claim 16 wherein the authentication challenge comprises the authentication context identifier, a random string, a timestamp, and a signature value.

18. The computer-implemented method of claim 17 wherein the signature value is computed based on the authentication context identifier, the random string, and the timestamp.

19. The computer-implemented method of claim 18 further comprising:
- computing a hashed password value based on the computed salt value;
- computing a message authentication code based on the random string and the hashed password value, or the random string, the timestamp, and the hashed password value; and
- returning a response to the server.

20. The computer-implemented method of claim 16 wherein the response comprises the username, the message authentication code, the random string, the timestamp, and the signature value.

* * * * *